2 Sheets—Sheet 1.

J. TCHERNIAC & U. GÜNZBURG.
Processes of and Apparatus for Making Ferrocyanides.

No. 222,547. Patented Dec. 9, 1879.

Witnesses
John M. Dumer
Harry Smith

Inventors
Joseph Tcherniac
and
Ury Gunzburg
by their Attorneys
Howson and Son

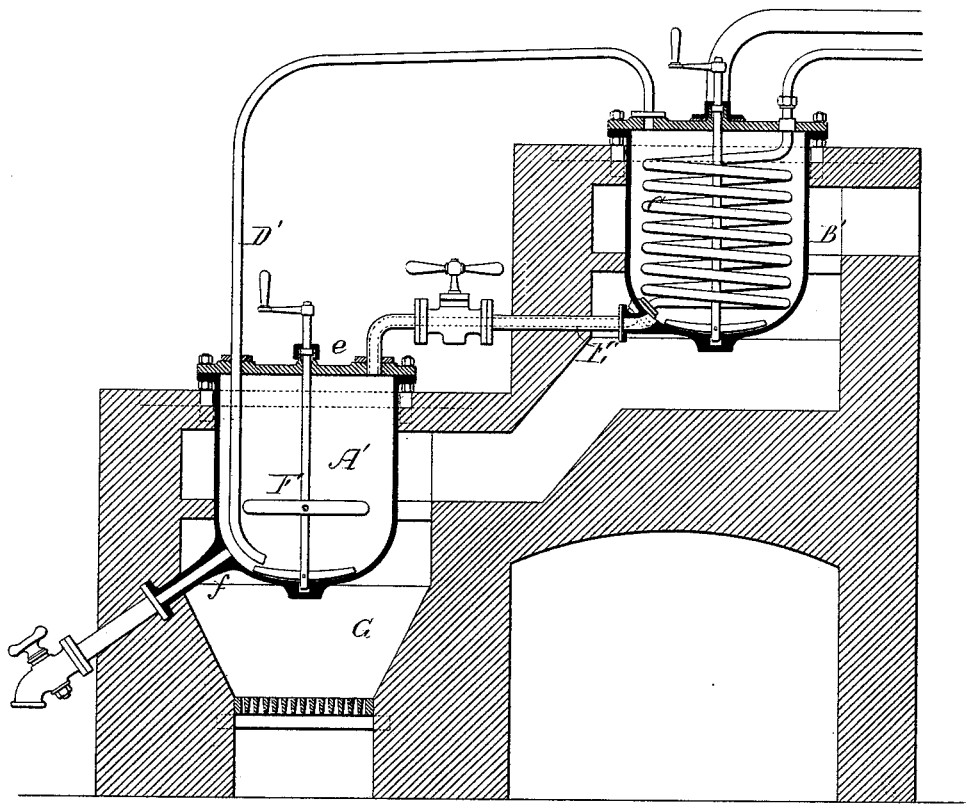
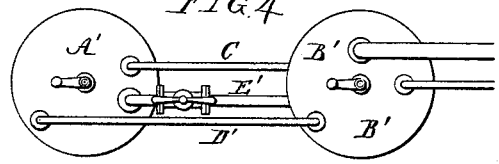

UNITED STATES PATENT OFFICE.

JOSEPH TCHERNIAC AND URY GÜNZBURG, OF PARIS, FRANCE.

IMPROVEMENT IN PROCESSES OF AND APPARATUS FOR MAKING FERRO-CYANIDES.

Specification forming part of Letters Patent No. 222,547, dated December 9, 1879; application filed September 25, 1879.

*To all whom it may concern:*

Be it known that we, JOSEPH TCHERNIAC and URY GÜNZBURG, both of Paris, in the Republic of France, have invented certain Improvements in Processes and Apparatus for Making Ferro-Cyanides, of which the following is a specification.

The object of our invention is to manufacture sulpho-cyanides and ferro-cyanides with an economy of the material employed; and this object we attain in the manner which we will now proceed to describe, reference being had to the accompanying drawings, in which—

Figure 1:
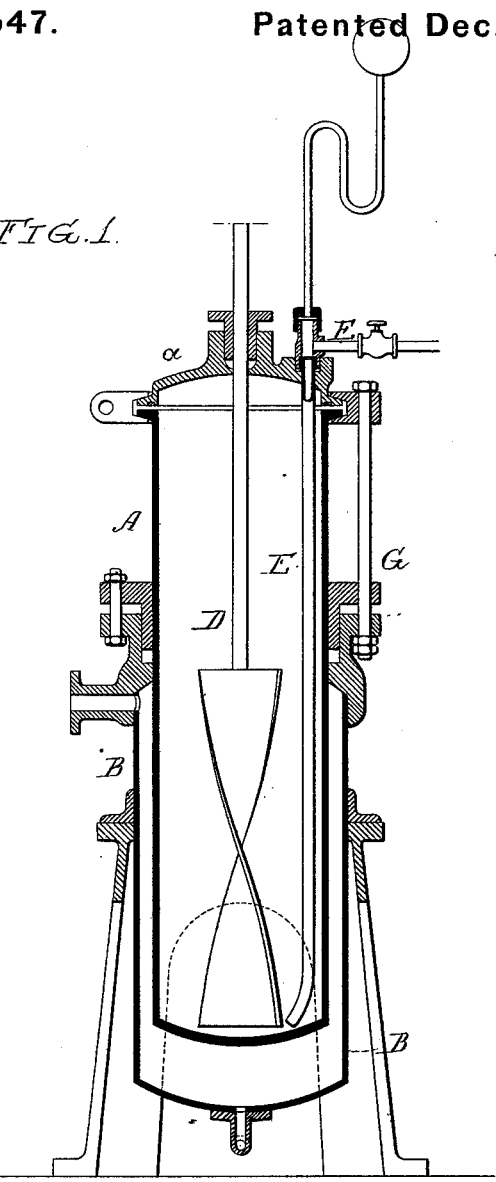
Figure 2:
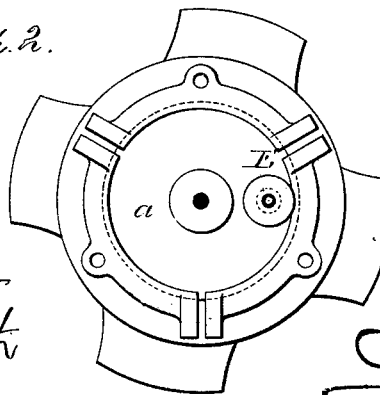

Figure 1, Sheet 1, is a vertical section, and Fig. 2 a plan view, of the apparatus we prefer to use for mixing the chemicals. Fig. 3, Sheet 2, is a sectional view of the apparatus for regenerating the ammonia; and Fig. 4, Sheet 2, is a plan view of a portion of the apparatus shown in Fig. 3.

In carrying out our invention we first thoroughly mix together about one hundred parts of carbon disulphide and two hundred parts of ammoniacal solution at twenty-five per cent., this mixing being preferably conducted under heat. The chemical reaction results in the formation of sulpho-cyanide of ammonium and sulphureted hydrogen, as shown in the following equation: $CS_2 + 2NH_3 = H_2S + NCS \ NH_4$. The liquid is then removed from the vessel, and after so much of the carbon disulphide as has not been acted on is drawn off, the compound is subjected to heat for a short time. The solution of sulpho-cyanide of ammonium, with a proper quantity of lime, is then introduced into an apparatus in which the ammonia is regenerated, the solution being decomposed into sulpho-cyanide of lime and ammonia. Then, to obtain the required sulpho-cyanide, it is only necessary to add a soluble carbonate or sulphate to obtain a precipitation of a sulphate or carbonate of lime. For instance, to obtain sulpho-cyanide of potassium we add to the sulpho-cyanide of lime a concentrated solution of sulphate of potash, filtered and evaporated, the sulphate of lime being at once precipitated and a solution of sulpho-cyanide of potassium produced.

We then decompose the sulpho-cyanide of potassium (or other sulpho-cyanide) into a ferro-cyanide in the following manner: We thoroughly mix together about six parts of sulpho-cyanide of potassium, carefully dried, with five parts of lime, five parts of carbon, and one part of finely-divided iron. This iron we obtain by reducing the residuum of pyrites of good quality by means of carbon, in an apparatus so constructed that the iron may be withdrawn without contact with the air.

The mixture of these completely-dried materials is heated to a red heat, and the following reaction takes place: $6KSCN + 5CaO + 5C + Fe = FeS + 5CaS + 5CO + 6KCN$. From this we obtain a solution of ferro-cyanide of potassium by dissolving it in water, as shown in the following equation: $FeS + 6KcN = K_2S + K_4FeC_6N_6$.

The solution obtained is concentrated and allowed to crystallize, furnishing in abundance crystals of yellow prussiate of potash.

Referring to the apparatus, which we prefer to use for mixing the solutions and regenerating the ammonia, A, Fig. 1, is a sheet-metal vessel enameled on the inside, and capable of withstanding a strong pressure, and having a detachable cover, a, through which passes a tube E, extending nearly to the bottom of the vessel, and provided at the top with a suitable cock, and also with a pressure-gage, if desired.

Through a stuffing-box in the said cover also, passes the shaft of a spiral stirrer, D; but this stirrer may be dispensed with.

The vessel is adapted to a steam-tight casing, B, the said vessel A and the casing being secured to each other by a rod or rods, G. This casing B is provided with a steam inlet and outlet.

In Fig. 3, Sheet 2, G is a furnace, immediately over the grate of which is arranged a vessel, A', provided with a stirrer, F, outlet $f$, and inlet $e$.

In the flue of the furnace above the vessel A' is arranged a second vessel, B', the lower part of which communicates through a pipe, E', with the upper part of the vessel A', while the upper part of said vessel B' communicates with the lower part of the vessel A' through a pipe, D'. From the upper part of the vessel A' extends a tube, C, (see detached plan view, Fig. 4,) which passes through the vessel B' in the form of a coil.

The hundred parts of carbon disulphide and two hundred parts of ammoniacal solution, above referred to, are introduced through the tube E into the vessel A, Fig. 1, and if the agitator D is not employed the lower part of the vessel is heated by introducing a current of steam into the vessel B, while the upper part of the vessel A is kept cool. A continued distillation of the more volatile liquid (carbon disulphide) then takes place from the hottest to the coldest portions of the vessel, thus producing a thorough mixture of the chemicals. At the end of three or four hours this part of the operation is complete, and there is formed sulpho-cyanide of ammonium and sulphureted hydrogen, as above described. The cock at the upper end of the tube E is then opened, and the pressure in the interior of the vessel A at once drives out the liquid through a suitable refrigerator into a vessel, from whence that portion of the carbon disulphide which has not been acted on is drawn off. Thence the sulpho-cyanide of ammonium is transferred to a vessel with a double casing, in which the solution is subjected to heat until it reaches a temperature of about 120° centigrade, when the further evaporation is stopped by cutting off the steam or other heating medium, and the solution of sulpho-cyanide then introduced with a suitable quantity of lime into the vessels A' and B', Sheet 2, each being filled about half-full of the mixture. It is in this apparatus that the sulpho-cyanide of ammonium is decomposed into sulpho-cyanide of lime and ammonia, the latter being regenerated.

The lower vessel, A', is subjected to heat and the gas disengaged passes off through the coil C, part of which is immersed in the solution in the vessel B', and the steam which is carried off with the gas in giving off its heat to this solution becomes condensed. The gas from the liquid in the vessel B' passes through the tube D' to mix with the ammonia in the vessel A', and thence through the coil C. This ammoniacal gas is thence conducted to suitable storing-tanks, where it is caused to saturate the ordinary ammonia of commerce. By this means we obtain the concentrated ammonia required in the first part of the operation.

When the thermometer indicates in the lower heater a temperature of 115° this vessel is emptied by opening the cock in the outlet-pipe $f$. Then by opening the cock in the pipe E' the solution in the upper vessel B' is allowed to flow into the vessel A', and a fresh supply is run into the vessel B'. In this manner the operation is made continuous.

It will be readily understood that where the sulpho-cyanide of ammonium itself is required for commercial purposes, it is only necessary to allow the evaporated liquid to crystallize in order to obtain the perfectly pure salt in beautiful crystals.

The sulpho-cyanide of lime obtained in the manner described serves as a medium for the production of other sulpho-cyanides, for it is sufficient to add a soluble carbonate or sulphate of any kind to at once cause the precipitation of sulphate or carbonate of lime, and the formation of a solution of the new sulpho-cyanide, as before referred to.

The formation of ferro-cyanides from sulpho-cyanides has been described above.

We are aware that sulpho-cyanides have heretofore been prepared by causing carbonic disulphide to act on a mixture of concentrated ammonia and sulphide of ammonium in a cold state, with the addition of a small quantity of fixed oil. This, therefore, we do not claim; but

We claim as our invention—

1. The within-described process of making ferro-cyanides, by first mixing together carbon disulphide and ammoniacal solution, then mixing the sulpho-cyanide of ammonium thus obtained with lime under heat, then adding to the solution a soluble carbonate or sulphate, and finally mixing with the resultant sulpho-cyanide lime, carbon, and iron in about the proportions set forth, and heating the mixture to a red heat, as specified.

2. In the process of making ferro-cyanides, the method of manufacturing sulpho-cyanides—that is to say, by first mixing together carbon disulphide and ammoniacal solution under heat, then mixing the resultant sulpho-cyanide of ammonium with lime under heat, and finally adding to the solution a soluble sulphate or carbonate, all substantially as set forth.

3. The combination of the furnace with vessels A' and B', the pipe D', forming the communication between the upper part of the vessel B' and the lower part of the vessel A', the valved pipe E', forming the communication between the bottom of the vessel B' and the top of the vessel A' and the coil C in the vessel B', and in communication at its lower end with the upper part of the vessel A', all substantially as described.

In testimony whereof we have signed our names to this specification in the presence of two subscribing witnesses.

JOSEPH TCHERNIAC.
URY GÜNZBURG.

Witnesses:
JOSEPH DELAGE,
ROBT. M. HOOPER.